United States Patent
Bossett

[11] Patent Number: 5,934,726
[45] Date of Patent: Aug. 10, 1999

[54] TRUCK ACCESSORY

[76] Inventor: Charles A Bossett, 1025 W. 76th St., Los Angeles, Calif. 90044

[21] Appl. No.: 08/858,491

[22] Filed: May 19, 1997

[51] Int. Cl.$^6$ .................................................. B62D 33/08
[52] U.S. Cl. ...................... 296/26.11; 296/165; 135/88.13
[58] Field of Search ................................ 296/26.11, 159, 296/161, 165, 3, 100.15, 26.08; 108/144.11; 135/88.13, 88.15; 126/304 R, 305

[56] References Cited

U.S. PATENT DOCUMENTS

| | | | |
|---|---|---|---|
| 2,465,621 | 3/1949 | Wheeler | 296/100.15 |
| 2,815,762 | 12/1957 | Smith | 135/88.13 |
| 3,410,598 | 11/1968 | Davis et al. | 296/26.11 |
| 3,703,181 | 11/1972 | Tholen | 135/88.13 |
| 3,968,809 | 7/1976 | Beavers | 296/161 |
| 4,065,166 | 12/1977 | Shoemaker | 296/161 |
| 4,088,363 | 5/1978 | Palmer | 296/161 |
| 4,109,954 | 8/1978 | Wall | 296/26.08 |
| 4,180,050 | 12/1979 | Sizemore | 126/304 R |
| 4,544,195 | 10/1985 | Gunn | 296/26.11 |
| 4,729,594 | 3/1988 | Hoff | 296/161 |
| 4,739,528 | 4/1988 | Allen | 296/100.15 |
| 4,856,840 | 8/1989 | Hanley | 296/161 |
| 5,037,152 | 8/1991 | Hendricks | 296/26.08 |
| 5,358,298 | 10/1994 | Fate | 135/88.15 |

Primary Examiner—D. Glenn Dayoan
Assistant Examiner—Long Bao Nguyen
Attorney, Agent, or Firm—Erik M. Arnhem

[57] ABSTRACT

An accessory for a pickup truck can include a rectangular platform hingedly attached to the floor of the truck cargo area for extension rearwardly beyond the truck tailgate. The platform can be used as a bed or as a picnic table. Inverted U-shaped arches can be mounted in sockets at the corners of the platform to support a fabric tent structure. When the tent structure is removed the corner sockets can be used as mounting devices for one or more food cooking stoves.

6 Claims, 3 Drawing Sheets

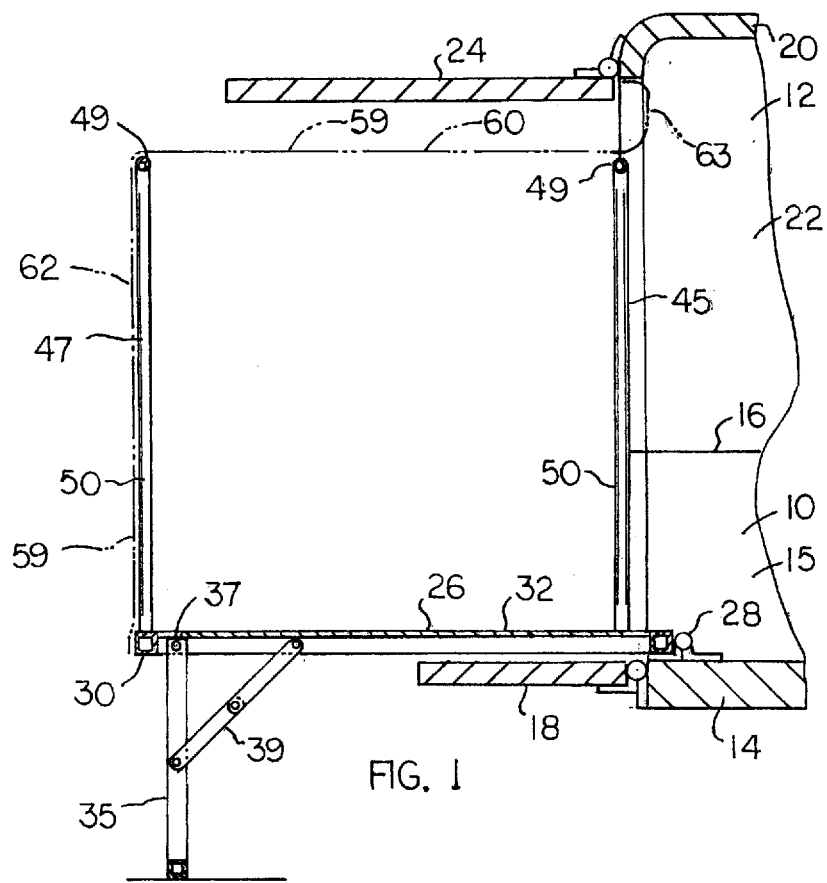
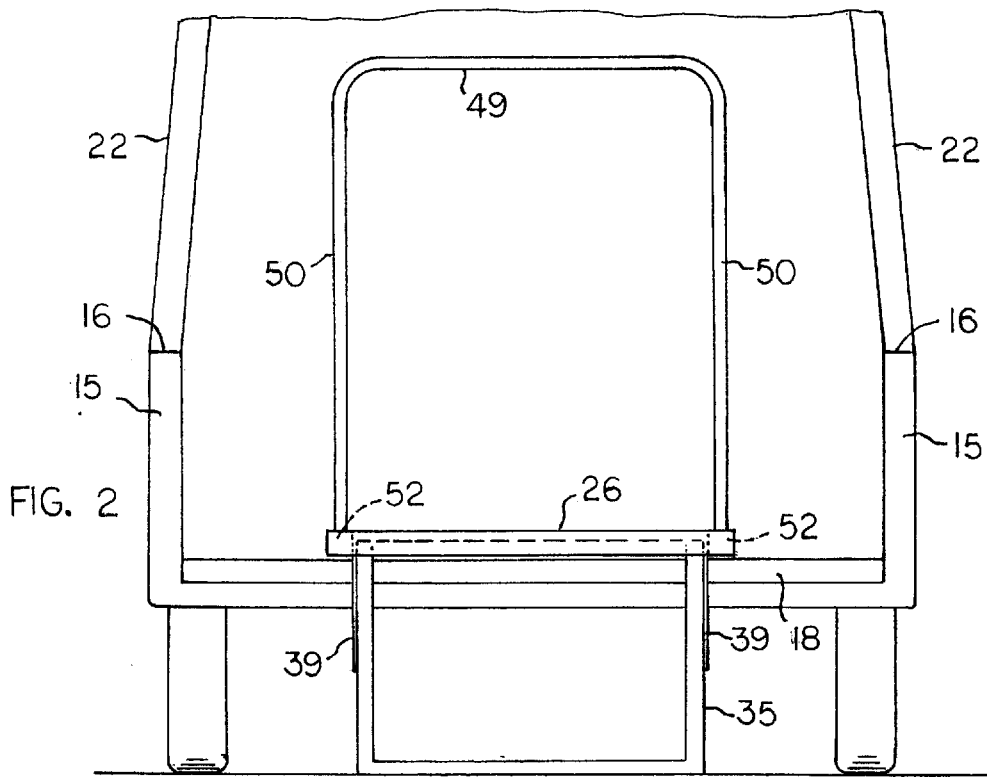

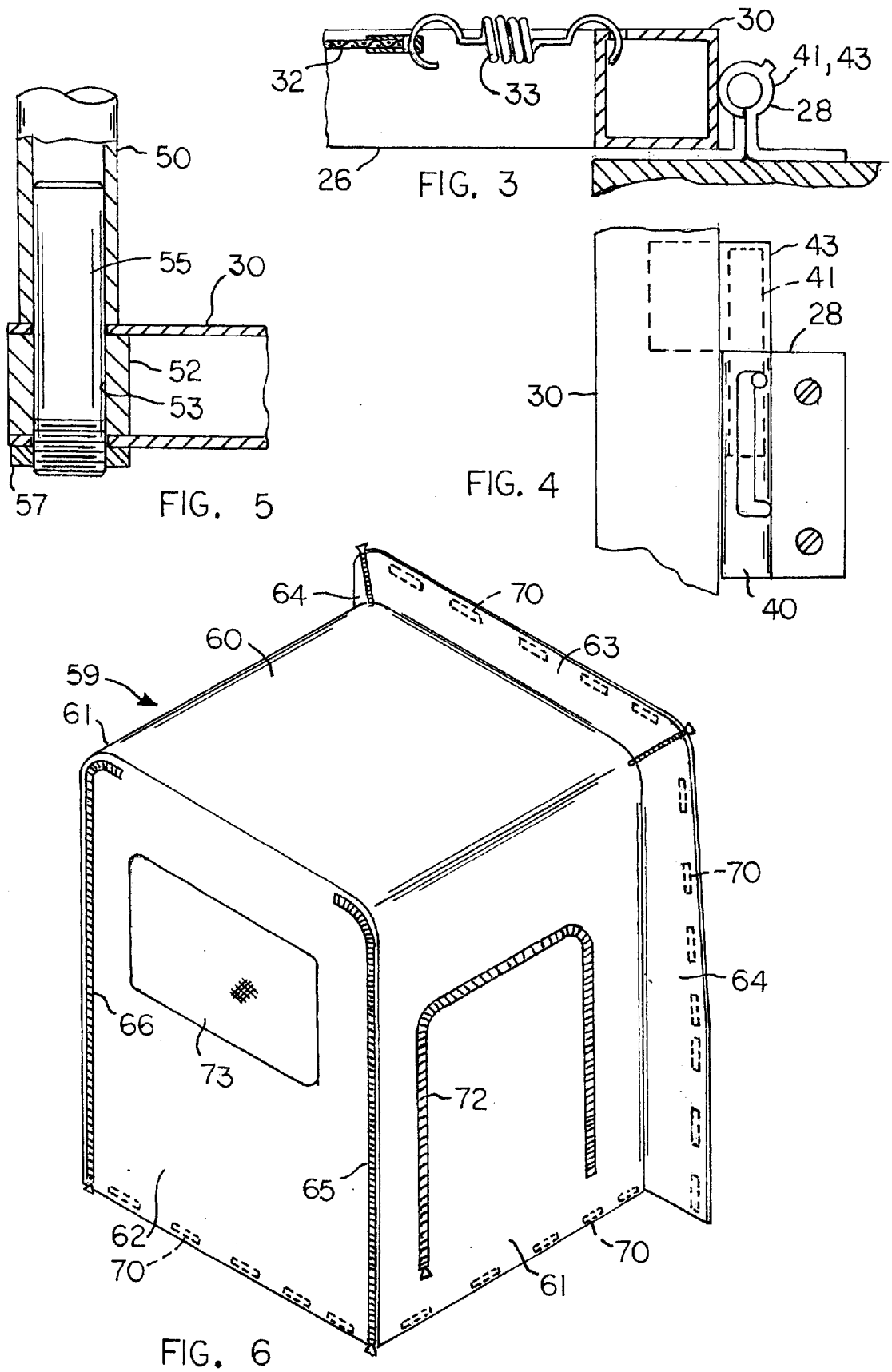

TRUCK ACCESSORY

BACKGROUND AND SUMMARY OF THE INVENTION

This invention relates to an accessory, or attachment, for a pickup truck, especially a pickup truck having a top structure overlying the load-carrying box. The invention is concerned with an add-on structure that adds to the versatility or usefulness of a pick-up truck.

In recent years the usefulness of pickup trucks has been increased by means of add-on top structures. Typically, the add-on top structure comprises a roof, front wall, two side walls, and a liftable rear window. The top structure is bolted, or otherwise attached, to the load-carrying box of the truck, so that the box and top structure cooperatively form an enclosed compartment behind the cab of the truck. The enclosed compartment can be used for carrying cargo, equipment or passengers.

The present invention is concerned with an add-on accessory usable on pick-up trucks to further enhance the usefulness of such trucks. The accessory comprises a rectangular platform that can be hingedly connected to the bed or floor of the load-carrying box so as to extend rearwardly out of the box beyond the tailgate. The platform can be used as a picnic table or as a bed. When the truck is to be driven, the platform is swung forwardly into the box, to assume a retracted position overlying the floor or bed of the box.

The platform comprises a rectangular frame and a fabric panel located within the frame; plural tension springs are trained between the frame and edge areas of the fabric panel to give the panel a certain degree of resilience. The fabric panel can thus form a comfortable support for a person lying on the panel surface. If desired, an air-inflatable mattress can be placed on the fabric panel to achieve a more comfortable support for the person.

For enhanced privacy a detachable tent structure can be provided around and over the platform when the platform is in the extended position. The tent structure is supported on a framework that includes a front arch and a rear arch. Each arch comprises a horizontal crosspiece and two downwardly extending posts adapted to fit into sockets at the front, or rear, corners of the platform.

The portable tent structure can be put up, or taken down, in a relatively short period of time, without special tools or equipment.

As an optional feature of the invention, one or more food-cooking devices can be supported at the rear corners of the platform when the platform is in its extended position for use as a picnic table. Each food-cooking device can be positioned on a vertical shaft that extends downwardly into one of the aforementioned sockets. A nut can be hand-tightened on the lower end of the shaft to releasably clamp the shaft to the socket structure.

From the above discussion, it will be seen that the invention contemplates an extendable hinged platform that can be used as a picnic table or as a bed (for resting purposes). When the platform is to be used as a picnic table a food cooking device can be supported at one or more corners of the platform. When the platform is to be used as a bed, a tent structure can be supported above the platform surface to give the person a degree of privacy and protection from the elements.

Specific features and advantages of the invention will be apparent from the attached drawings and description of an illustrative embodiment of the invention.

BRIEF DESCRIPTION OF THE DRAWINGS

FIG. 1 is a fragmentary longitudinal sectional view taken through a pick up truck equipped with an accessory constructed according to the invention.

FIG. 2 is a rear elevational view of the structure depicted in FIG. 1.

FIG. 3 is an enlarged fragmentary view of a frame and hinge structure used in the FIG. 1 arrangement.

FIG. 4 is a fragmentary plan view of the FIG. 3 hinge structure.

FIG. 5 is an enlarged fragmentary view of a corner area of a rectangular frame used in the FIG. 1 assembly. FIG. 5 shows some features of a frame-post connection mechanism that are not visible in FIG. 1.

FIG. 6 is a perspective view of a flexible (foldable) tent structure that can be used in the FIG. 1 embodiment of the invention.

DESCRIPTION OF A PREFERRED EMBODIMENT OF THE INVENTION

Figure 7:
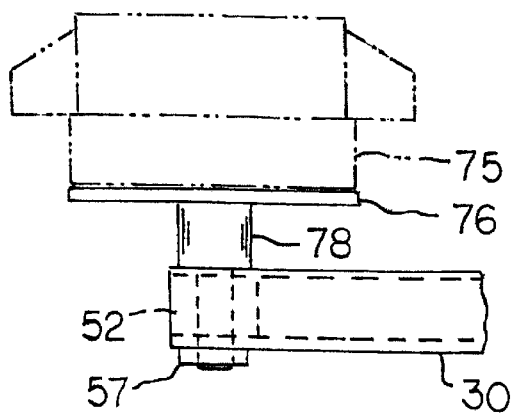
FIG. 7 is an elevational view of a mechanism that can be used to support a food-cooking device above one corner of the platform depicted in FIG. 1 (when the platform is used as a picnic table).

Referring especially to FIGS. 1 and 2, there is shown a conventional pickup truck having a load-carrying box 10 and an overlying top structure 12. The box has a floor 14 and two side walls 15 having upper edges 16. A tailgate 18 is hingedly connected to the box so as to be movable between an open position essentially aligned with floor 14 and a closed position extending upwardly from the plane of floor 14.

Top structure 12 comprises a roof 20, two downwardly extending side walls 22 having lower edges sealed on the upper edges 16 of the box side wall, and a hinged rear window 24. The rear window can be swung downwardly to close the opening above tailgate 18.

The invention is more particularly concerned with an add-on accessory usable with, or on, the conventional truck structure. The illustrated accessory comprises a rectangular platform 26 having a hinged connection 28 with the floor 14 of the load-carrying box, such that the platform can be manually swung around the hinge 28 axis between an overturned retracted position overlying floor 14 and an extended position extending rearwardly beyond tailgate 18 (as shown).

Platform 26 comprises a rectangular frame 30, formed of square cross-section tubing, and a fabric panel 32 located within the space circumscribed by the rectangular frame. Edge areas of the fabric panel are connected to frame 30 by spaced tension springs 33, as shown e.g. in FIG. 3. The total number of tension springs will vary according to the dimension of the fabric panel. Typically, there are sixty springs spaced at six inch intervals around the perimeter of the fabric panel. Metal grommets may be secured to the fabric material at the spring attachment points to minimize tearing of the fabric. The tension springs give the fabric panel a resilience that tends to provide some comfort for a person lying on the panel, e.g. when sleeping or resting. At the same time, the fabric panel is reasonably taut so that platform 26 can be used as a picnic table for eating purposes. When the platform is used as a table the platform surface is covered with a table cloth.

The rear end of platform 26 is supported by means of a folding leg structure 35 formed out of square cross section tubing. A transverse pivot rod 37 extends along the upper edge of the folding leg structure between the side members of rectangular frame 30, whereby the leg structure can be swung around the rod 37 axis to a retracted condition lying alongside the fabric panel 32. Two foldable brace structures 39 interconnect side areas of the leg structure with frame 30 to stabilize the leg structure in the FIG. 1 position.

Referring to FIGS. 3 and 4, hinge connection 28 can include two aligned hinge units, one of which is depicted in FIG. 4. The stationary knuckle 40 slidably supports a retractible pintle 41, whereby the movable knuckle 43 (attached to frame 30) can be separated from the stationary knuckle, e.g. should it be desired to separate platform 26 from the vehicle for storage purposes. Various types of hinges can be used in practice of the invention.

Referring to FIGS. 1 and 2, there is shown a tent support mechanism that includes a front arch 45 and a rear arch 47. Each arch comprises an elongated tubular element bent into an inverted U configuration that includes a cross piece 49 and two downwardly extending posts 50. Each post fits into a socket 52 formed at, or near, a corner of the rectangular frame 30. FIG. 5 illustrates the general construction of each socket.

As shown in FIG. 5, the socket comprises an anchorage plug 52 welded, or otherwise secured, within one of the tubes of frame 30. The plug has a cylindrical bore that forms an elongated hollow guide surface 53. Each tubular post 50 has a circular rod 55 welded to the post lower end, whereby the rod can have a close sliding fit in an associated hollow guide surface 53. A nut 57 can be hand tightened on the threaded end of rod 55 to exert a clamp action against the lower surface of frame 30. The tent support means is thus rigidly, but removably, connected to frame 30. Plug 52 is an advantageous optional feature; each post can be operatively connected to the frame by extending the associated rod 55 through aligned openings in the frame. Plug 52 reinforces and rigidifies the connection.

FIG. 1 shows a tent structure 59 in dashed lines, draped over the front and rear arches 45 and 47 as a form fit. FIG. 6 shows the tent structure separated from the support means. The tent is formed of a flexible weather-resistant fabric, with zipper connections that permit the fabric to be placed around the support means without excessive effort. The tent comprises a roof panel 60, two side panels 61, and a rear panel 62. Side flaps 64 extend from side panels 61 to cover areas between the tent sides and rear surface areas of the vehicle. An upper flap 63 extends from roof panel 60 to cover the area between the roof panel and the vehicle opening formed by rear window 24. Creases may be formed in the tent fabric to define the panels and facilitate placement of the tent structure on the supporting arches 45 and 47.

The tent structure has no front panel or bottom panel. The tent structure is designed so that internal corner areas of the tent fit on the posts 50 and cross pieces 49. In order to facilitate placement of the tent around arches 45 and 47 the tent structure has a first zipper means 65 connecting rear panel 62 to the right side panel, and a second zipper means 66 connecting rear panel 62 to the left side panel. Both zipper means are left open while the tent structure is being placed over the arches 45 and 47. When the tent structure is in place the zippers are closed, as shown in FIG. 6.

Figure 9:
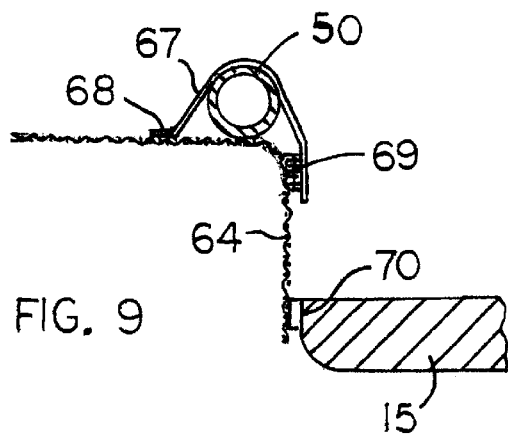
FIG. 9 fragmentarily shows a flap that can be employed on the FIG. 6 tent structure to seal the peripheral space between the side wall of the tent and the rear edge surface of the associated vehicle.

Since the tent has no front panel, there is a tendency for the tent panels to pull away from the front arch 45. To prevent the pull away condition the tent structure has internal ties or rings adapted to encircle the front cross piece 49 and both front posts 50. FIG. 9 shows a representative tie that can be used. As shown, the tie comprises a flexible strip 67 having one end attached to the tent material, as at 68. The other end has a patch of adhesive fibrous hook and loop material adapted to connect with a mating patch of material on the tent wall; the mating patches are designated by numeral 69. The patch material is commercially available, e.g. under the tradename VELCRO.

FIG. 9 shows one of the side flaps 64 extended from the associated tent side panel 61 laterally so as to bridge the space between the tent and the vehicle rear surface. Permanent magnets 70 can be sewn or adhesively attached to the tent material at the flap edges to releasably attach the flap material to the vehicle rear surfaces. Such magnets can be used along flaps 64 and 63, as well as along the lower edges of panels 61 and 62. The aim is to achieve a relatively close disposition of the tent fabric against the vehicle surface or frame 30 surface, so as to deter or minimize the entry of flies and mosquitos into the tent space.

To facilitate entry of a person into the tent space a zipper means 72 is provided in one of the side panels 61. Preferably the zipper means is operable from either inside the tent or outside the tent. To promote air circulation through the tent structure a window 73, formed of a net material, can be provided in rear panel 62.

When the tent structure and the supporting arches are removed from platform 26 the vacant sockets 52 can be used as mounting devices for food-cooking apparatus. FIG. 7 shows in dashed lines a conventional kerosene stove 75 positioned on a horizontal plate or table 76. The stove may be a commercial product available from the Coleman Co.

Plate 76 has a downwardly extending shaft 78 adapted to be removably seated in one of the sockets 52 in platform 26. The lower end of the shaft is threaded to receive a clamping nut 57.

Figure 8:
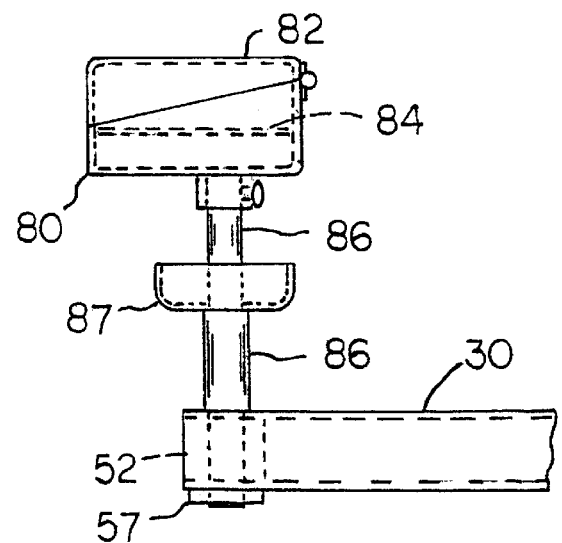
FIG. 8 shows an alternative food-cooking device that can be used in practice of the invention.

FIG. 8 shows a food cooking barbeque 80 having a hinged lid 82 and an internal food-supporting grille or grate 84. The space below grate 84 can be used for charcoal. A shaft 86 extends downwardly from the barbeque into one of the sockets 52 in platform 26. The shaft is secured by a clamping nut 57. As an optional feature, a small annular dish 87 can be positioned on shaft 86 below the barbeque. Ice placed in dish 87 provides a cool atmosphere below the barbeque, such that the hot products-of combustion are directed upwardly away from people attending the barbeque or eating at the table 26.

It will be seen that the invention provides an add-on accessory for a pickup truck, designed to improve its versatility or usefulness. The platform 26 can be used as a picnic table or as a bed. A collapsible fabric tent structure can be mounted to the platform for protection of the person from the weather elements. When the tent structure and its supporting mechanism are removed the vacant corner sockets 52 can be used to support one of more cooking devices.

What is claimed:

1. In a truck having a load-carrying box that includes a floor and a hinged tailgate, and a top structure overlying said box, the combination comprising:

a rectangular platform having a first end hingedly connected to said floor, and a second end locatable behind the tailgate when the platform is in a horizontal extended position;

a foldable leg structure hingedly connected to said platform near the second end of said platform;

said platform comprising a rectangular frame, a fabric panel within said frame, and a series of tension springs trained between said frame and edge areas of said fabric panel;

said rectangular frame having four corners, and a socket at each corner; each socket comprising an anchorage plug having an elongated hollow cylindrical guide surface;

a tent support means comprising a front arch and a rear arch, each arch comprising a crosspiece and two posts having lower ends adapted to be removably seated in selected ones of said sockets;

each post comprising a cylindrical rod extendable through one of the hollow cylindrical guide surfaces, and a clamping nut threadable on said rod to rigidly secure the post to the associated anchorage plug;

a flexible fabric tent structure adapted to have a form fit on said tent support means; said tent structure comprising a roof panel, two side panels, and a rear panel;

a first zipper means joining said rear panel to one of the side panels; a second zipper means joining said rear panel to the other side panel; said rear panel and said side panels having lower edges adapted to extend closely along edge areas of said rectangular frame.

2. The combination of claim 1, and further comprising a flap extending from each side panel of the tent structure for disposition against rear surface areas of the load-carrying box and top structure.

3. In a truck having a load-carrying box that includes a floor and a hinged tailgate, and a top structure overlying said box, the combination comprising:

a rectangular platform having a first end hingedly connected to said floor, and a second end locatable behind the tailgate when said platform is in a horizontal extended position; and a foldable leg structure hingedly connected to said platform proximate to the second end of said platform;

said platform comprising a rectangular frame, a fabric panel within said frame, and a series of tension springs trained between said frame and edge areas of said fabric panel.

4. In a truck having a load-carrying box that includes a floor and a hinged tailgate, and a top structure overlying said box, the combination comprising:

a rectangular platform having a first end hingedly connected to said floor, and a second end locatable behind the tailgate when said platform is in a horizontal extended position;

a foldable leg structure hingedly connected to said platform proximate the second end of said platform;

said platform comprising a rectangular frame having four corners; and a socket at each corner of said frame; each said socket comprising an anchorage plug having an elongated hollow cylindrical guide surface; and a tent support means that includes four upright posts, each said post having a lower end removably seated in one of said sockets; the lower end of each post comprising a cylindrical rod extendable through an associated hollow cylindrical guide surface, and a clamping nut threaded onto said rod to rigidly secure the post to the anchorage plug.

5. In a truck having a load-carrying box that includes a floor and a hinged tailgate, and a top structure overlying said box, the combination comprising:

a rectangular platform having a first end hingedly connected to said floor, and a second end locatable behind the tailgate when said platform is in a horizontal extended position;

a foldable leg structure hingedly connected to said platform proximate the second end of said platform;

said platform comprising a rectangular frame having four corners; and a socket at each corner of said frame;

a tent support means that includes four upright posts, each post having a lower end removably seated in one of said sockets; and a food-cooking device having a downwardly-extending shaft adapted to be removably seated in one of said sockets when said one socket is not occupied by one of said posts.

6. The combination of claim 3, wherein each socket comprises an anchorage plug having an elongated hollow cylindrical guide surface; said shaft of said food-cooking device being adapted to extend through said hollow cylindrical guide surface, and a clamping nut threaded onto said shaft to rigidly secure the shaft to the anchorage plug.

* * * * *